(12) United States Patent
Zaazaa

(10) Patent No.: US 12,465,869 B2
(45) Date of Patent: Nov. 11, 2025

(54) PROGRAMMABLE TOY

(71) Applicant: Quantum Toys LLC, St. Petersburg, FL (US)

(72) Inventor: Adham Achraf Youssef Zaazaa, Cairo (EG)

(73) Assignee: Quantum Toys LLC, St. Petersburg, FL (US)

( * ) Notice: Subject to any disclaimer, the term of this patent is extended or adjusted under 35 U.S.C. 154(b) by 124 days.

(21) Appl. No.: 18/417,863

(22) Filed: Jan. 19, 2024

(65) Prior Publication Data
US 2024/0246000 A1     Jul. 25, 2024

Related U.S. Application Data

(60) Provisional application No. 63/480,720, filed on Jan. 20, 2023.

(51) Int. Cl.
| | | |
|---|---|---|
| *A63H 13/00* | (2006.01) | |
| *A63H 3/02* | (2006.01) | |
| *A63H 3/28* | (2006.01) | |

(52) U.S. Cl.
CPC ............. *A63H 13/005* (2013.01); *A63H 3/02* (2013.01); *A63H 3/28* (2013.01); *A63H 2200/00* (2013.01)

(58) Field of Classification Search
None
See application file for complete search history.

(56) References Cited

U.S. PATENT DOCUMENTS

| | | | |
|---|---|---|---|
| 6,285,924 B1 * | 9/2001 | Okamoto | G01C 21/3661 701/1 |
| 9,914,062 B1 * | 3/2018 | Jiencke | G09B 19/04 |
| 2018/0221779 A1 * | 8/2018 | Kasuga | A63H 13/04 |

* cited by examiner

*Primary Examiner* — Ifedayo B Iluyomade
(74) *Attorney, Agent, or Firm* — Lerner David LLP

(57) ABSTRACT

A programmable toy is disclosed. The programmable toy includes a head member, a body member, a joint connecting the head and body members, one or more servo motors, a plurality of strings, a mobile application, and programmable instructions in the mobile application to allow the programmable toy to move on its own.

16 Claims, 3 Drawing Sheets

PROGRAMMABLE TOY

CLAIM OF PRIORITY

This application claims priority to U.S. Provisional Patent Application No. 63/480,720, filed on Jan. 20, 2023, entitled "PROGRAMAMBLE TOY" the contents of which are hereby incorporated by reference.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to the field of toys, particularly soft and/or stuffed toys. More particularly, the present disclosure relates to a programmable toy that combines a head and body connected by a joint with servo motors and strings configured to manipulate the joint, optionally by executing programmed instructions.

BACKGROUND

Traditional soft or stuffed toys have been a favourite of small children for well over a hundred years. The softness and flexibility of such toys, along with their typical resemblance to animals or fictional characters makes their appeal to children obvious.

However, such soft toys also have distinct weaknesses, as compared to the modern field of toymaking. Traditional soft toys cannot move on their own, and cannot hold positions or poses that children place them into. Further, soft toys do not interact with children on an aural level.

Therefore, there is a need to create soft toys that move, hold poses, make noises, and/or are interactive, in order to make soft toys even more appealing to children. Further, integrating modern techniques such as customizable/programmable software instructions and mobile application integration should make such features even more appealing.

SUMMARY OF THE INVENTION

The present disclosure provides for a programmable toy having a head member and a body member. The body member includes a first rotary servo motor and a second rotary servo motor and the head member includes a third rotary servo motor. The programmable toy in accordance with the present disclosure includes a first set of strings which are interconnected between the first rotary servo motor and to the head member. Preferably one of the strings of the first pair of strings is connected to a first connection point on the first rotary servo motor and the other of such strings is connected to a second connection point on the first rotary servo motor. The programmable toy in accordance with the present disclosure also includes a second set of strings which are interconnected between the second rotary servo motor and to the head member. Preferably one of the strings of the second pair of strings is connected to a first connection point on the second rotary servo motor and the other of such strings is connected to a second connection point on the second rotary servo motor.

The programmable toy in accordance with the present disclosure also includes a joint disposed between the head member and the body member, where the joint has an anteroposterior axis, a lateral axis, and a vertical axis and is configured to provide a bi-lateral hingeable connection between the head member and the body member about the anteroposterior axis and the lateral axis. Preferably, the joint is also rotatably attached a third rotary servo motor which is configured to rotate the head member about the vertical axis. The first rotary servo motor and the first pair of strings are configured to provide for anteroposterior movement between the head member and the body member via the joint and the second rotary servo motor and the second pair of strings are configured to provide for lateral movement between the head member and the body member via the joint.

Preferably, the first rotary servo motor is configured to actuate between a first position where the first set of strings are actuated such that the head member hinges in front of the body member and a second position where the first set of strings are actuated such that the head member hinges behind of the body member. Also preferably, the second rotary servo motor is configured to actuate between a first position where the second set of strings are actuated such that the head member hinges to the left of the body member and a second position where the second set of strings are actuated such that the head member hinges to the right of the body member. In some embodiments, the first rotary servo motor can rotate up to 180 degrees in either direction from an initial position and in other embodiments the first rotary servo motor can rotate up to 120 degrees in either direction from the initial position. In some embodiments, the second rotary servo motor can rotate up to 180 degrees in either direction from an initial position and in other embodiments the second rotary servo motor can rotate up to 120 degrees in either direction from the initial position. Preferably, the first pair of strings and the second pair of strings are constructed out of polyester. In a highly preferred embodiment, each of these polyester strings is a 4-strand braid of polyester strands.

In a preferred embodiment, the programmable toy in accordance with the present disclosure also includes a communications module having a memory, a processor, and a speaker where the memory, the processor, and the speaker are in electrical communication. In some embodiments, a user is able to upload one or more custom audio files to the memory, where the processor is configured to process the one or more custom audio files for transmittal via the speaker.

In other embodiments, the communications module includes an electronic transceiver configured to transmit and receive electronic signals via one or more of RF, Bluetooth, WiFi, and/or 5G technologies. Preferably, the first rotary servo motor, the second rotary servo motor, and the third rotary servo motor is configured to be wirelessly controlled via this transceiver. In another preferred embodiment the communications module is configured to be wirelessly controlled, preferably through a software application on a smartphone or similar internet-enabled device by interfacing with the transceiver.

In some embodiments, the joint may be bent along each of the anteroposterior axis and the lateral axis. In some embodiments, the one or more servo motors are configured to create tension in the first pair of strings and/or the second pair of strings.

In some embodiments, the mobile application includes a set of programmable instructions to manipulate the one or more servo motors and the plurality of braided polyester strings in order to manipulate the head member, relative to the body member.

In an embodiment, the joint is configured to rotate along the vertical axis, preferably through use of the one or more servo motors.

In an embodiment, the plurality of braided polyester strings includes four strings, preferably where each string is disposed at a different point equidistant from the anteroposterior axis and the lateral axis.

In an embodiment, the programmable toy includes a camera.

In an embodiment, the programmable toy includes a speaker.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

DETAILED DESCRIPTION OF THE PREFERRED EMBODIMENTS

Figure 1:
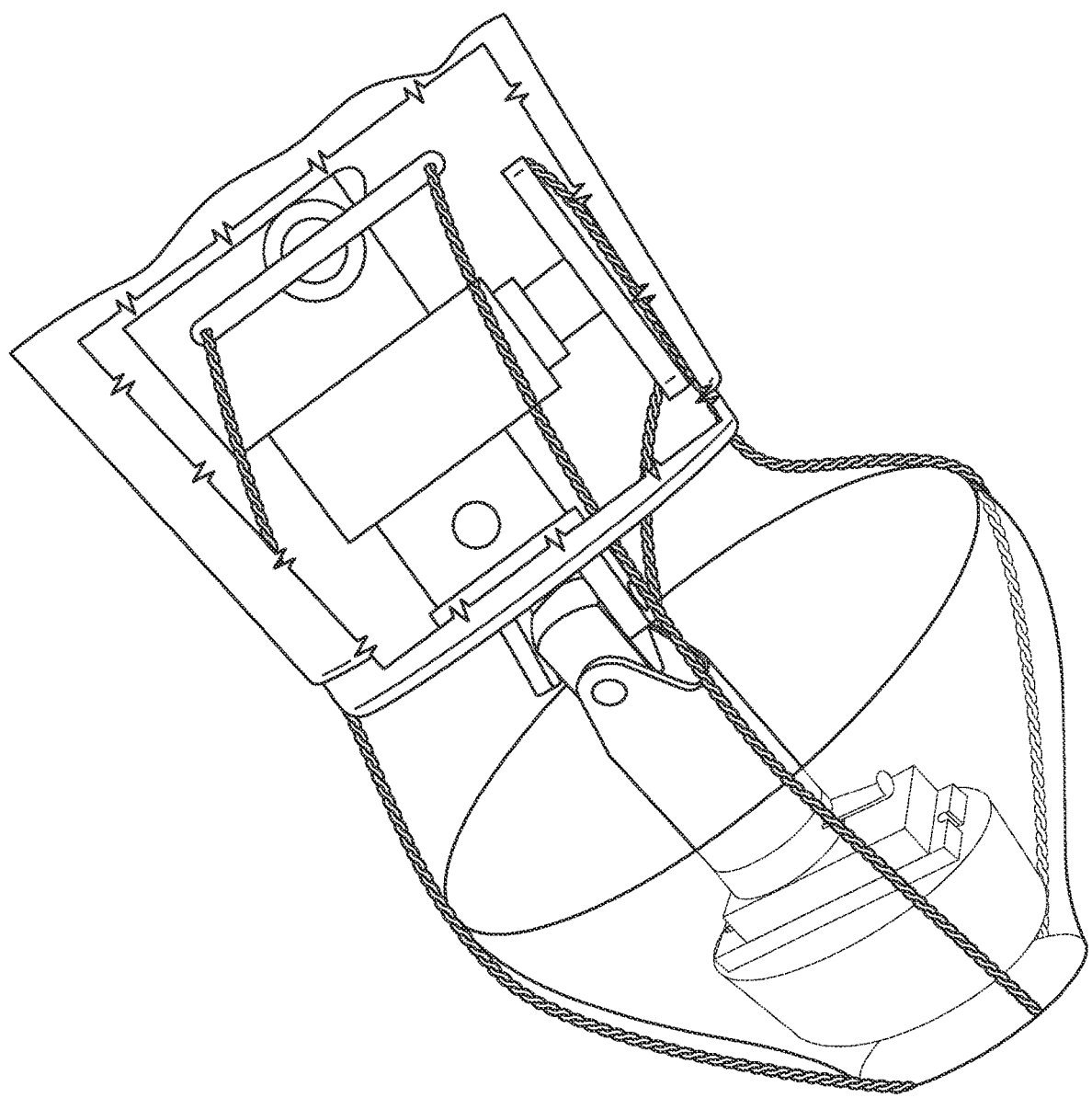
FIG. 1 shows a perspective view of an embodiment of an internal mechanism of the programmable toy in accordance with the present disclosure.

Referring to FIG. 1, an embodiment of the programmable toy is depicted, with a cutout to better show the internal components. This embodiment shows body member 102 which includes a first rotary servo motor 104 and a second rotary servo motor 106 as well as a head member 116 Preferably, the first rotary servo motor 104 and the second rotary servo motor 106 are disposed in a perpendicular arrangement, where their respective axis of rotation are also in a perpendicular arrangement. Each of the first rotary servo motor 104 and the second rotary servo motor 106 include a rotating member equipped with both first string attachment point and a second string attachment point. Preferably each of these rotating members is a 'T' shape where the first string attachment point and the second string attachment point are disposed on opposite arms of the 'T' and where each of the rotary servo motors 104 and 106 rotates the stem of the 'T' while actuating. Preferably, each of the rotary servo motors 104 and 106 has an initial position and are configured to be able to rotate up to 180 degrees in either direction from this initial position. In other embodiments, each of the rotary servo motors 104 and 106 has an initial position and are configured to be able to rotate up to 120 degrees in either direction from this initial position.

Also shown in FIG. 1 is a first pair of strings 108 interconnected between the first rotary servo motor 104 and the head member 116. While this view shows the first pair of strings 108 connected to a top of the head member 116, various embodiments exist where the first pair of strings 108 is connected to other portions of the head member 116 provided that the first pair of strings 108 has a length such that tension can be created therein by the actuation of the first rotary servo motor 104.

Here the first pair of strings 108 is shown as a braid of strands, which is a preferred embodiments. Other embodiments exist where a single strand is used, while other embodiments exist where each of the first pair of strings 108 is a 4-strand braid. Preferably, the first pair of strings is constructed out of polyester, although other plastics may be used in other embodiments. The braided polyester provides for greater longevity of the programmable toy in accordance with the present disclosure and provides for more consistent simulated movements of said toy when each of the rotary servo motors 104 and 106 are actuated. Braided polyester strings are highly preferred for use in the present invention due to their combination of durability, strength, and softness to the touch. The benefits of polyester strings in such embodiments include significant improvements to resistance to wear and tear (and thus higher reliability), while still being soft enough to prevent irritation or damage to the extremities of children handling the programmable toy, when compared to toys common in the field. Although polyester strings are preferred in most embodiments, other braided or unbraided materials may also be used, as long as they include the required properties of being: durable, strong, and soft to the touch.

FIG. 1 also shows a second pair of strings 110 interconnected between the second rotary servo motor 106 and the head member 116. Similarly to the first pair of strings 108, the second pair of strings 110 is attached to the top of the head member 116 in this embodiments, but other embodiments exist where the second pair of strings 110 is connected to other portions of the head member 116, provided that the second pair of strings 110 has a length such that tension can be created therein by the actuation of the second rotary servo motor 106. Both the head member 116 and the body member 102 are shown in cylindrical-like enclosures, but any rigid or semi-rigid structure would be suitable for use in accordance with the present disclosure.

FIG. 1 also shows a joint 112 which is disposed between the body member 102 and the head member 116. The joint 112 can bend along two axes, an anteroposterior axis and a lateral axis. It should be noted that for the purposes of this disclosure these two axes can be used interchangeably as these are relative terms meant to describe the joint 112 providing for the hingable connection between the body member 102 and the head member 116. The joint 112 provides this hingable connection when tension is generated in either or both of the first and second pair of strings 108 and 110 by either or both of the rotary servo motors 104 and 106. When either of the rotary servo motors 104 and 106 are actuated, one of the attached strings of the respective pair of strings 108 or 110 is pulled such the joint 112 is forced to move to compensate for such actuation. This results in the hingable movement between the body member 102 and the head member 116, simulating natural body motion in the programmable toy. Additionally, FIG. 1 shows a third rotary servo motor 114 which can rotate the joint about a vertical axis, providing rotational movement of the head member 116. The third rotary servo motor 114, like the first and second rotary servo motors 104 and 106 has an initial position and in an embodiment can rotate 180 degrees in either direction from this initial position. In other embodiments the third rotary servo motor 114 can rotate 120 degrees in either direction from this initial position, and in a preferred embodiment, the third rotary servo motor 114 can rotate 90 degrees in either direction.

Figure 2:
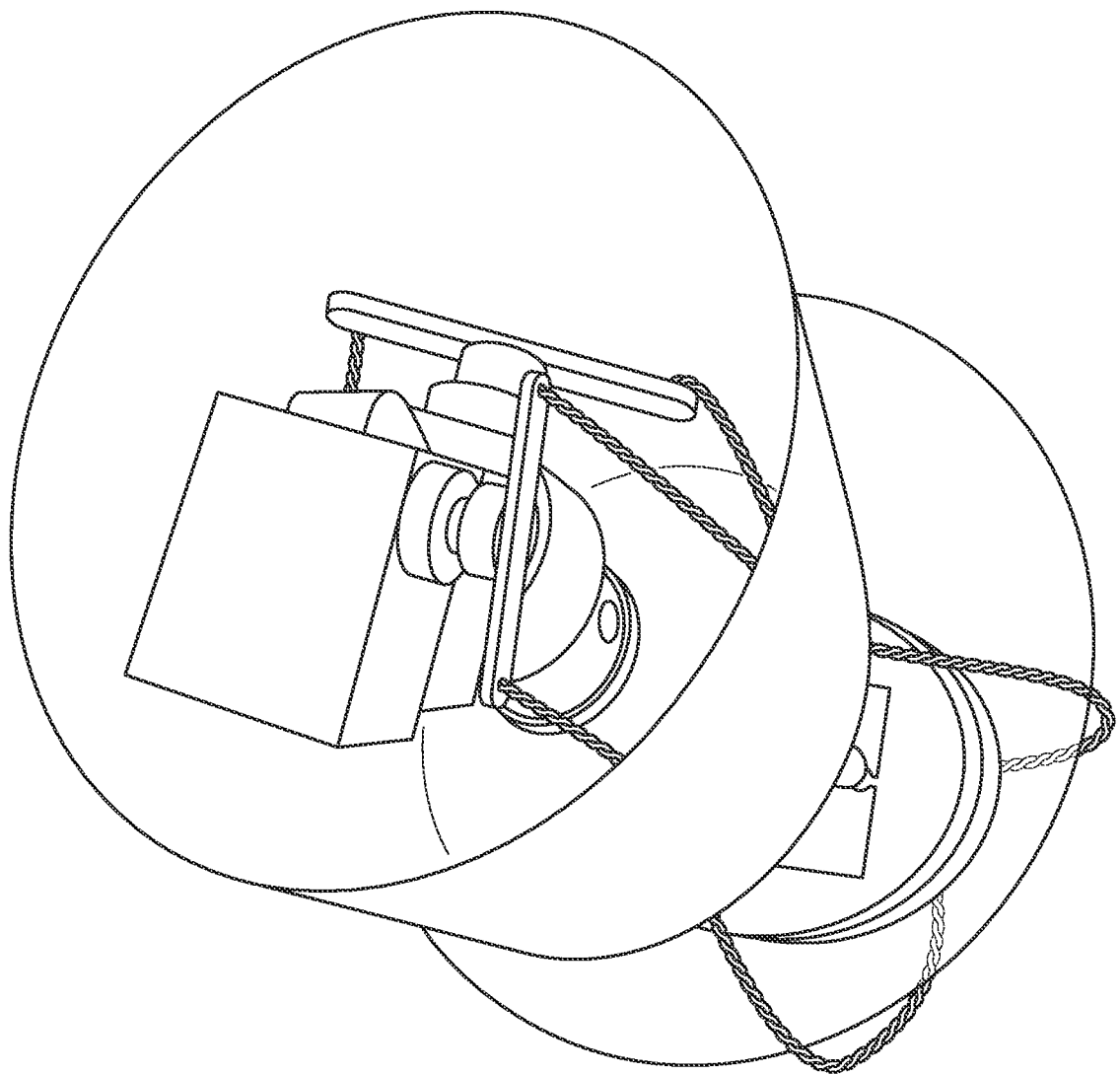
FIG. 2 shows a bottom perspective view of the embodiment shown in FIG. 1.
Figure 3:
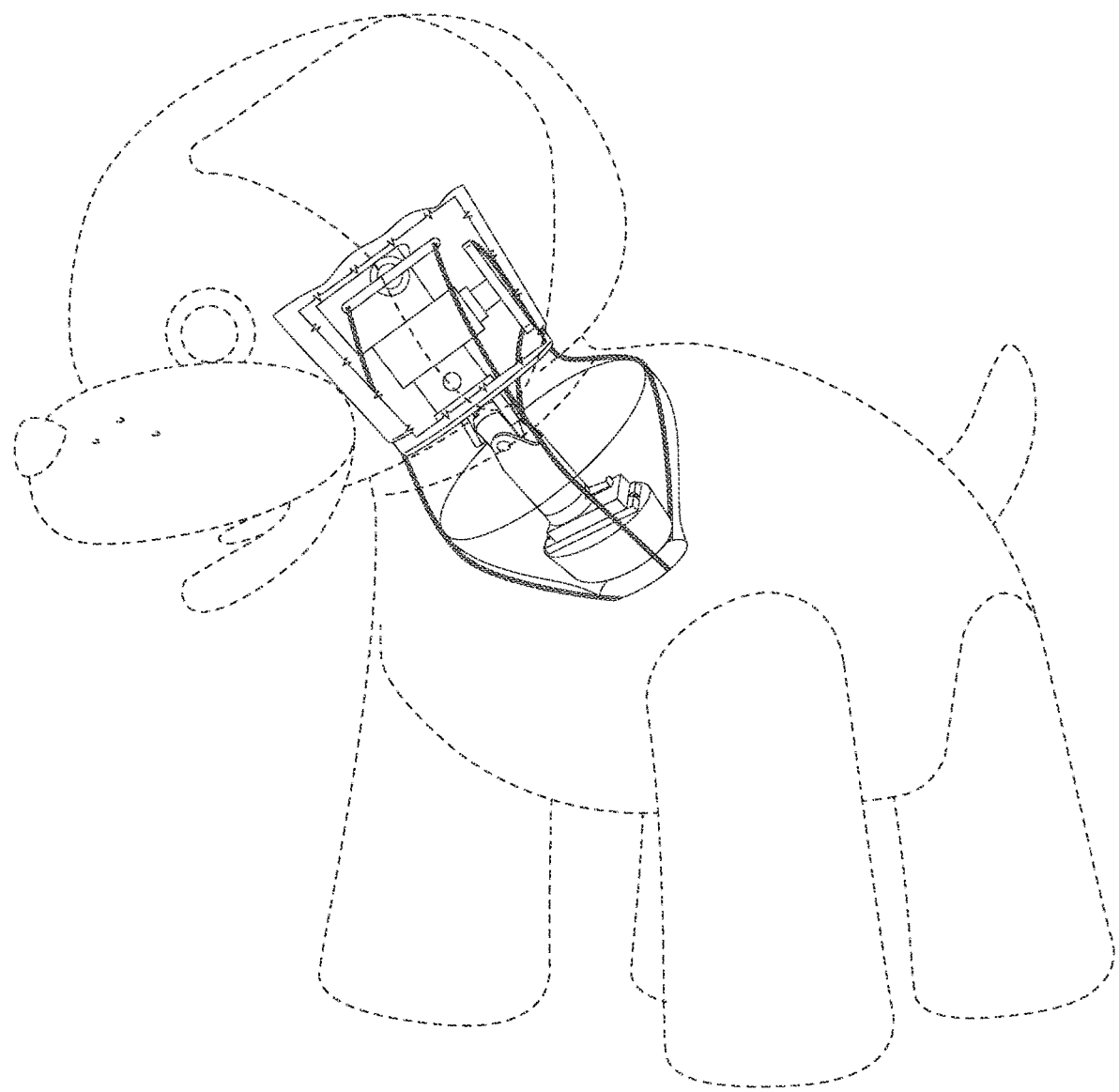
FIG. 3 shows a perspective view of the embodiment shown in FIG. 1, showing the location of the internal mechanism shown within a programmable toy in accordance with the present disclosure.

FIG. 2 shows an alternative view of the embodiment shown in FIG. 1, to better illustrate the respective configuration of the first rotary servo motor 104 and the second rotary servo motor 106. FIG. 3 shows the embodiment of FIG. 1 within a soft outer shell resembling a dog, to illustrate how the body member 102 and the head member 116 would be placed within such a soft outer shell.

In some embodiments, the joint 112 is disposed between the head member and the body member, and preferably directly connects the head member 116 and the body member 102, more preferably as the sole point of connection between the head member 116 and the body member 102.

In some embodiments, the plurality of braided polyester strings includes at least four strings, each string disposed at a different point equidistant from the anteroposterior axis and the lateral axis, preferably where each of the four strings is located at four different points equidistant to the vertical axis, where each point describes a single plane orthogonal to the vertical axis, and where each point is located on an axis diagonal to the anteroposterior and lateral axes.

In some embodiments, the programmable toy includes a communications module having a memory, a processor, and a speaker all of which are in electronic communication. In some embodiments, the communications module includes a wireless transceiver. Preferably, in these embodiments, the communications module is configured to communicate with other electronic devices using one or more of: Bluetooth, WiFi, and/or 5G technologies, although in many embodiments, any technology used to communicate wirelessly between electronic devices may be used.

In some embodiments, the programmable toy includes a mobile application. Preferably, the mobile application includes a set of programmable instructions to manipulate the one or more servo motors and the plurality of braided polyester strings in order to manipulate the head member, relative to the body member. In some embodiments, the programmable instructions are editable and/or customizable by a user through the mobile application. For instance, if a user desires to cause the programmable toy to nod its head, in such embodiments, the user may open the mobile application, enter the appropriate set of programmable instructions, and execute the instructions, to cause the programmable toy to move or act in a large variety of ways. In various embodiments, a user may upload custom audio files such as animal noises, a song, or a prerecorded message for future playback by the programmable toy in accordance with the present disclosure.

In some embodiments, the programmable toy includes a camera. In some embodiments, the programmable toy includes a speaker. Such speaker is preferably configured to emit a variety of sounds. In some embodiments, the sounds emitted by the speaker are predetermined, for example, by the manufacturer. In other embodiments, the sounds emitted by the speaker may be customizable by the user, preferably through the mobile application. In some embodiments, the speaker may also be configured to record sounds from the surroundings of the programmable toy, such as to record and identify voice commands for execution of certain movements by the programmable toy, which may be executed in conjunction with the mobile application and the programmable instructions.

In some embodiments, one or more of the joint, the one or more servo motors, and the plurality of braided polyester strings is enclosed in a global enclosure. Preferably, such global enclosure is a hard enclosure, and designed for protection of the components within.

In various embodiments, the programmable toy in accordance with the present disclosure can have electronic instructions uploaded to the memory such that a routine can be "performed" by the toy. That is, specific actuations instructions for any or all of the rotary servo motors can be executed in sequence to provide the appearance of the programmable toy moving. This can be simple movements such as a head nod or head shake, or can comprise more advanced choreography. These instructions can be executed in tandem with the speaker playing a prerecorded audio message such as a song or personalized greeting.

It is understood that when an element is referred to hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

For purposes of the present disclosure of the invention, unless specifically disclaimed, the singular includes the plural and vice-versa, the words "and" and "or" shall be both conjunctive and disjunctive, the words "any" and "all" shall both mean "any and all".

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. Programmable toy, comprising:
    a body member, having a first rotary servo motor and a second rotary servo motor;
    a head member having a third rotary servo motor;
    a first pair of strings interconnected between the first rotary servo motor and to the head member,
    a second pair of strings interconnected between the second rotary servo motor and to the head member;
    a joint disposed between the head member and the body member, the joint having an anteroposterior axis, a lateral axis, and a vertical axis,
    wherein the joint is configured to provide a bi-lateral hingeable connection between the head member and the body member about the anteroposterior axis and the lateral axis,
    wherein the joint is rotatably attached to the third rotary servo motor,
    wherein the first rotary servo motor and the first pair of strings are configured to provide for anteroposterior movement between the head member and the body member via the joint,
    wherein the second rotary servo motor and the second pair of strings are configured to provide for lateral movement between the head member and the body member via the joint, and
    wherein the third rotary servo motor is configured to provide for rotation of the head member about the vertical axis.

2. The programmable toy of claim 1, further comprising a communications module having a memory, a processor, and a speaker,
    wherein the memory, the processor, and the speaker are in electrical communication.

3. The programmable toy of claim 2, the first rotary servo motor having a first position where the first set of strings are actuated such that the head member hinges in front of the body member.

4. The programmable toy of claim 3, the first rotary servo motor having a second position where the first set of strings are actuated such that the head member hinges behind of the body member.

5. The programmable toy of claim 4, the second rotary servo motor having a third position where the second set of strings are actuated such that the head member hinges to the left of the body member.

6. The programmable toy of claim 5, the second rotary servo motor having a fourth position where the second set of strings are actuated such that the head member hinges to the right of the body member.

7. The programmable toy of claim 6, wherein a user can upload one or more custom audio files to the memory, wherein the processor is configured to process the one or more custom audio files for transmittal via the speaker.

8. The programmable toy of claim 7, wherein the first set of strings and the second set of strings are constructed out of polyester.

9. The programmable toy of claim 8, wherein each string of the first set of strings and the second set of strings is of a 4-strand braided polyester construction.

10. The programmable toy of claim 9, wherein the first rotary servo motor can rotate up to 180 degrees from an initial position.

11. The programmable toy of claim 9, wherein the first rotary servo motor can rotate up to 120 degrees from an initial position.

12. The programmable toy of claim 9, wherein the second rotary servo motor can rotate up to 180 degrees from an initial position.

13. The programmable toy of claim 9, wherein the second rotary servo motor can rotate up to 120 degrees from an initial position.

14. The programmable toy of claim 9, the communications module further comprising an electronic transceiver configured to transmit and receive electronic signals via one or more of RF, Bluetooth, WiFi, and/or 5G technologies.

15. The programmable toy of claim 14, wherein the first rotary servo motor, the second rotary servo motor, and the third rotary servo motor is configured to be wirelessly controlled via the transceiver.

16. The programmable toy of claim 15, wherein the communications module is configured to be wirelessly controlled.

* * * * *